Aug. 9, 1955 P. M. SARLES 2,714,801
VARIABLE AREA NOZZLE FOR A GAS TURBINE
Filed Aug. 21, 1952
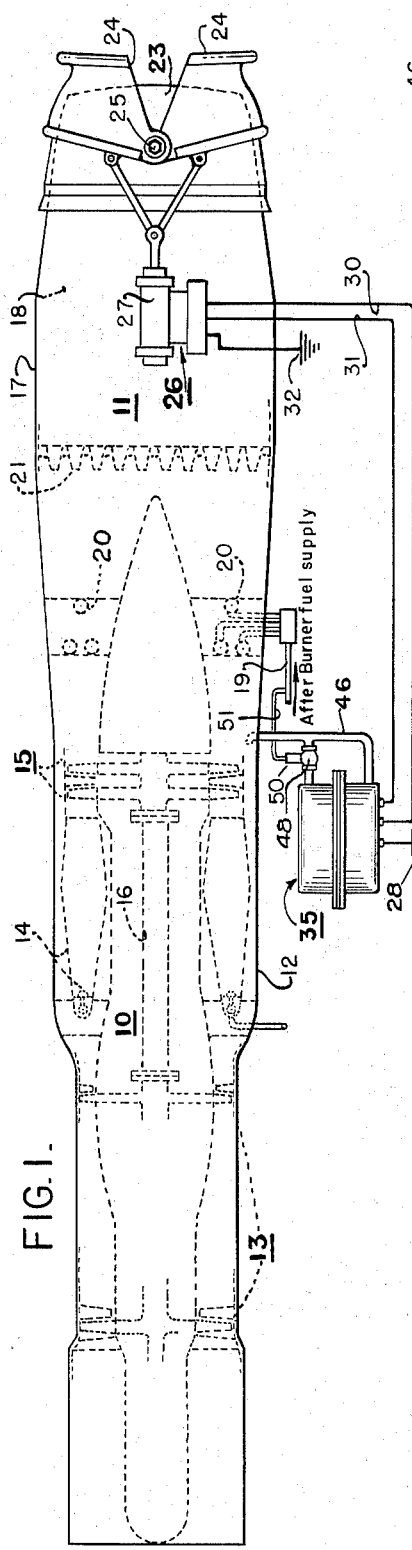
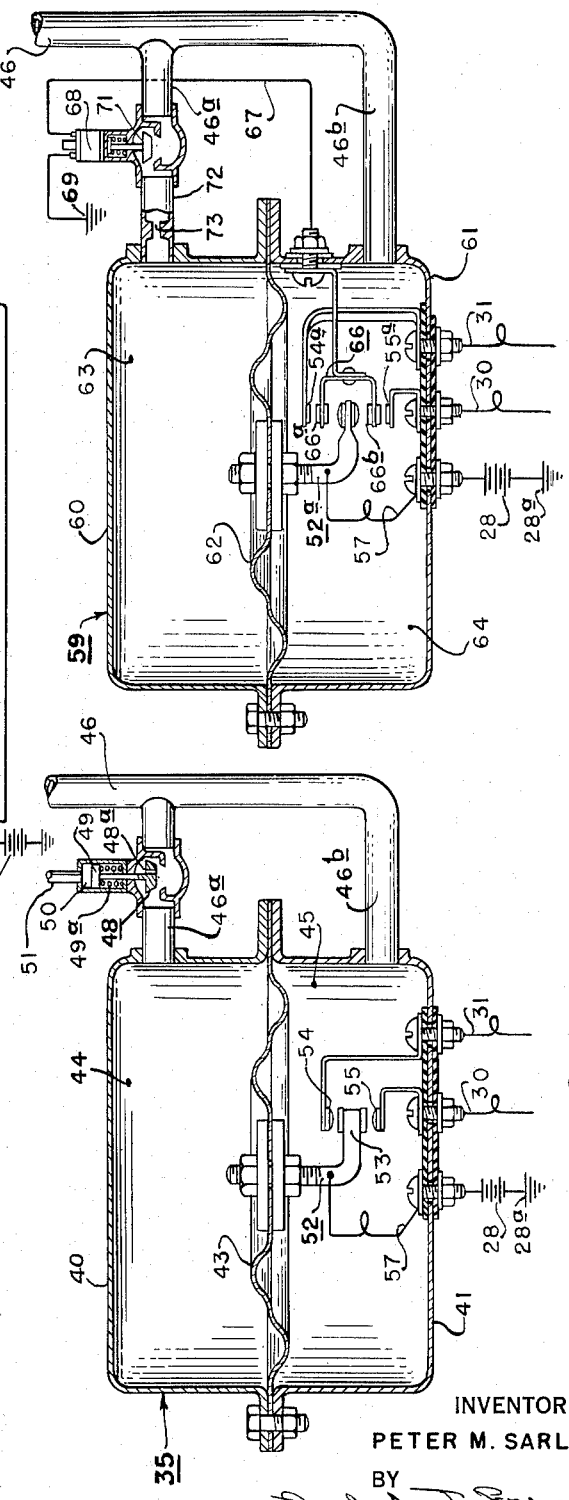
INVENTOR
PETER M. SARLES
ATTORNEY

2,714,801

VARIABLE AREA NOZZLE FOR A GAS TURBINE

Peter M. Sarles, Wilton, Conn., assignor to Westinghouse Electric Corporation, East Pittsburgh, Pa., a corporation of Pennsylvania Application August 21, 1952, Serial No. 305,580

5 Claims. (Cl. 60—35.6)

This invention relates to controls for power plants, particularly to automatic control apparatus for a gas turbine engine or aviation turbojet equipped with afterburner and variable area nozzle means, and has for an object the provision of improved control apparatus of this character.

In controlling the operation of a power plant of this class, the variable area nozzle must be open when the afterburner is lighted or initially is set in operation, to avoid imposition of high back pressures on the gas turbine. When operation of the afterburner ceases, owing to a "light off" or "blow out" condition at high altitude, the nozzle must be closed to reduce the exhaust flow area so that turbine outlet pressure will not fall with a consequent loss in thrust. Suitable means for actuating the elements of a variable area nozzle are well known, and may comprise a hydraulic motor controlled by solenoid valves which are adapted to be selectively energized through the medium of nozzle opening and closing electrical circuits. It has been proposed to provide combustion indicator apparatus serving to initiate selective operation of such an electro-responsive variable area nozzle means, to effect opening or closing of the nozzle of an afterburner in an aviation gas turbine engine in response to changes in operational characteristics, such as the afterburner momentum pressure drop or the scheduled turbine pressure ratio. Combustion indicator apparatus of the construction heretofore proposed has not been entirely satisfactory, however, as it has necessitated provision of unduly complex and expensive equipment. Among other disadvantages inherent in such apparatus in current use are the requirement of multiple pressure taps and reduction in overall efficiency in bleeding air discharged by the compressor, long pressure delivery intervals of time, and the requirement of time delay relays in conjunction with the pressure switch. In addition, the actuating pressures for such apparatus tend to change incident to warping of the afterburner, inducing improper operation of the switch, particularly at high altitudes.

In order to obviate the aforesaid disadvantages and to promote quick and effective operation of a gas turbine power plant equipped with an afterburner and electro-responsive nozzle area controlling apparatus, it is another object of the present invention to provide relatively simple and inexpensive means responsive to a single combustion pressure characteristic of an afterburner for selectively energizing the nozzle opening and closing circuits of the apparatus.

Another object of the invention is the provision of improved afterburner detector switch means responsive to the rate of change of pressure in an afterburner for selectively energizing the nozzle opening and closing circuits of electro-responsive variable area nozzle apparatus.

It is a further object to provide combustion pressure detector means of the foregoing type which may be adapted for controlling a gas turbine power plant of a stationary type.

To achieve these objects, the invention features improved means for applying turbine discharge static pressure to a switch device which in general compares steady state pressure with pressure transients arising from "light off" or "blow out" conditions in the afterburner. When the pressure transients are detected an electrical signal is applied to the exhaust nozzle actuating apparatus to effect operation thereof to meet the requirements of the engine.

These and other objects are effected by my invention as will be apparent from the following description taken in connection with the accompanying drawing, forming a part of this application, in which:

Fig. 1 is a longitudinal schematic view of an aviation turbojet power plant equipped with diagrammatically illustrated electro-responsive control apparatus for a variable area nozzle, with which is associated a rate of pressure change switch device constructed in accordance with the invention;

Fig. 2 is an enlarged detail sectional view of the rate of pressure change control apparatus shown in Fig. 1; and Fig. 3 is a similar view of a different form of rate of pressure change control apparatus constructed in accordance with the invention.

A typical turbojet power plant, as shown in Fig. 1, may comprise a gas turbine engine 10 and an afterburner 11. The engine 10 includes casing structure 12 having mounted therein an axial-flow compressor 13, combustion apparatus 14, and a turbine 15, which is operatively connected to the compressor through the medium of a shaft 16. The afterburner 11 comprises cylindrical casing structure 17, the forward end of which is secured to the engine casing structure 12, and which has formed therein an afterburning chamber 18. Suitable fuel supply means (not shown) may be provided for metering liquid fuel to the combustion apparatus 14. Fuel supply nozzles 20 are mounted in the afterburning chamber 18 and are connected by way of a fuel supply pipe 19 to a suitable source of fuel under pressure for feeding liquid fuel to the afterburner when its operation its desired. A conventional flame holder or grid 21 may be mounted in the afterburning chamber downstream of the fuel nozzles 20.

Formed in the discharge end of the afterburner casing structure 17 is a nozzle 23, the flow area of which can be varied by operation of variable area nozzle means comprising a pair of jointly movable arcuate lid elements 24, which are hinged on pins 25 carried by the casing structure. For the purpose of illustration, diagrammatic electro-responsive nozzle actuating apparatus 26 is provided for operating both lid elements 24, it being understood that this apparatus may be of any suitable construction well known in the art. The nozzle actuating apparatus 26 may, for example, include a hydraulic motor 27 controlled by conventional solenoid valves and holding relays (not shown) which are adapted to be selectively energized from a suitable source of electrical energy 28 through the medium of electrical circuits, such as a nozzle closing circuit 30 and a nozzle opening circuit 31, which may be grounded at 32 as diagrammatically shown in the drawing. The details of these circuits are deemed unnecessary for disclosure of the present invention, it being understood that energization of the closing circuit 30 will cause the nozzle actuating apparatus 26 to effect restriction of the flow area of the nozzle 23, while energization of the opening circuit 31 will result in enlargement of the nozzle area. A detailed disclosure of one form of such a nozzle actuating apparatus is found in the copending application of Cyrus F. Wood, Serial No. 121,171, filed October 13, 1949, and assigned to the assignee of the present invention.

According to the invention, an afterburning detector switch device, generally indicated at 35, is provided for controlling energization of the respective nozzle closing circuit 30 and nozzle opening circuit 31, in response to variations in gas pressure in the afterburner. As diagrammatically shown in Fig. 2, the switch device 35 comprises a pair of casing sections 40 and 41 which are bolted or otherwise suitably secured together adjacent the casing structure 17 of the afterburner. A movable abutment or flexible diaphragm 43 is mounted between the casing sections 41 and 40, and divides the interior thereof into a reference pressure chamber 44 and an operating pressure chamber 45. The chambers 44 and 45 communicate with the discharge passage of the turbine 15 and consequently with the afterburning chamber 18 by way of a conduit or passage 46, one branch 46a of which is connected to the chamber 44 and another 46b of which is connected to the chamber 45. Interposed in the branch 46a is a fluid pressure-responsive cut-off valve 48, which is operativly connected to a piston 49 subject to the pressure of fuel in a cylinder 50. The cylinder 50 is connected by way of a conduit 51 to the afterburner fuel supply line 19. Upon supply of fuel to the afterburner, the increase in pressure in the cylinder operates the piston to close the valve 48. A spring 49a is interposed between the piston 49 and the lower wall of the cylinder for biasing the valve 48 open. A restricted bleed port 48a is formed in the valve 48 to permit retarded equalization of the pressures on opposite sides thereof when the valve is closed.

A contact element 52 is carried on the movable diaphragm 43 and terminates in an end 53 that is interposed between a pair of spaced stationary contact elements 54 and 55 which are carried in chamber 45 by the casing 41. Each of these contact elements is suitably insulated from the casing. The outer end of the contact element 54 is connected to the nozzle opening circuit 31, while the outer end of the contact element 55 is connected to the nozzle closing circuit 30. The movable contact element 52 is connected by a conductor 57 to one terminal of the electrical energy source 28, the other terminal of which may be grounded, as at 28a, to complete either of the circuits 30 or 31 by way of the common ground connection 32 when the contact element 52 is moved into engagement with one or the other of the contact elements 54 and 55. The details of these diagrammatic circuit arrangements do not form part of the present invention, however, and the circuits have been chosen for illustrative purposes only, it being understood that any other suitable nozzle control circuits may be substituted for selective energization to control the nozzle area in accordance with operation of the combustion pressure-responsive switch devices 35.

During operation of the gas turbine apparatus 10 without afterburning, in the absence of fuel pressure in conduit 19 and the connected cylinder 50, the valve 48 is held open by the spring 49a, so that both chambers 44 and 45 are charged with gas under the same pressure, that is, steady-state turbine-discharge static pressure. When afterburning is to be effected, fuel under pressure destined for the afterburner 11 is supplied to the conduit 19, whereupon the valve 48 is closed by the piston 49 in response to the increase in pressure of fuel in the cylinder 50. Gas at the steady-state turbine outlet pressure is thereby bottled up in the reference pressure chamber 44. Upon ignition of the after burner by the usual ignition means (not shown), the pressure of gas in the conduit 46 and in the actuating pressure chamber 45 rises sharply, causing the diaphragm 43 to move the contact element 53 into engagement with the contact element 54 for energizing the nozzle opening circuit 31. Thus, owing to the transitory pressure differential incident to ignition, the nozzle opening circuit 31 is energized and causes the nozzle actuating apparatus 26 to open the lid elements for increasing the flow area of the nozzle 23, thereby preventing the development of high back pressures on the gas turbine component of the power plant. The pressure of gas in the reference pressure chamber 44 is subsequently equalized with that in the chamber 45, corresponding to the steady-state turbine discharge pressure under afterburning conditions, and the diaphragm 43 then assumes its normal intermediate position with the contact element spaced from the contact element 54.

On the other hand, when a "blow-out" occurs, the actuating pressure in chamber 45 is quickly reduced, since extinction of the flame in the afterburning chamber 18 causes a sudden drop in gas pressure. The pressure of gases still bottled up in the chamber 44, owing to the restricted passage 48a in the closed valve 48, then operates the diaphragm 43 to carry the contact element 52 into engagement with the contact element 55, thereby effecting energization of the nozzle closing circuit 30 for causing operation of the lid elements 24 to reduce the nozzle flow area for maintaining a desirable thrust value.

It will thus be seen that by interposing the improved afterburning detector switch embodying the invention in a conventional nozzle controlling circuit of a type heretofore employed, automatic control of operation of the variable area nozzle will be maintained efficiently in quick response to accurate indications of the state of combustion in the afterburner 11. When the afterburner is not being operated, however, the valve 48 remains open so that pressures on opposite sides of the diaphragm 43 are maintained equal to prevent undesired operation of the switch owing to possible fluctuations in turbine outlet pressure.

Referring to Fig. 3, a modified form of control apparatus 59 embodying the invention may comprise a casing section 60, a casing section 61 and a movable abutment or flexible diaphragm 62 clamped between the casing sections to provide a reference pressure chamber 63 and an operating pressure chamber 64. The diaphragm 62 carries a movable switch contact element 52a which, like the contact element 52 in Fig. 2, is connected by a conductor 57 to the portion of the control circuit including the power source 28. The terminal end of the contact element 52a extends into alignment with and between a stationary contact element 54a of the nozzle opening circuit 31, and a stationary contact element 55a of the nozzle closing circuit 30. In this embodiment of the invention, another switch element 66 is associated with the foregoing switch elements, comprising a branch contact portion 66a which is interposed between the contact elements 52a and 54a, and a branch contact portion 66b which is interposed between the contact elements 52a and 55a. The switch element is flexible, and is connected through a conductor 67 with one terminal of a magnetic coil 68, the other terminal of which may be grounded at 69.

The coil 68 is adapted to be energized for closing a normally open shut-off valve 71, which is interposed in a passage or pipe 71 connecting the reference pressure chamber 63 through the conduit 46 to the turbine discharge passage, as shown in Fig. 1. An orifice or restricted passage 73 disposed in the passage 72 in series with the communication is controlled by the valve 71.

In operation, gas at turbine discharge static pressure is supplied to the chamber 64 by way of the conduit 46 and branch 46b, and to the reference pressure chamber 63 through the branch 46a and past the initially open valve 71. During steady-state operation of the power plant there is no switching action of the control apparatus 59, since the pressures on both sides of the diaphragm are equal, and the contact elements 52a, 66a, 66b, 54a and 55a are held in spaced relation, as shown in Fig. 3. When fuel is supplied to the afterburner and ignited, however, a sudden rise in pressure of gas at the discharge side of the turbine, and a corresponding rise in gas pressure in the chamber 64, are effected, while the restricted orifice 73 retards flow of the gas at increased pressure into the reference pressure chamber 63. The resultant differential in pressure operates the diaphragm 62 to move the contact element 52a into contact with the contact portion 66a of the element 66, closing the circuit through which the coil 68 is energized. The valve 71 is thereby closed, trapping gas in the reference pressure chamber 63 at a pressure slightly above the initial turbine-discharge steady-state static pressure, since a limited flow of gas at increased pressure has meanwhile been effected by way of the orifice 73. Continued movement of the diaphragm by pressure of gas in the chamber 64 causes contact of the element 66a with contact element 54a to effect energization of the nozzle opening circuit 31, thereby effecting the desired increase in the engine nozzle flow area.

As the operating pressure in the chamber 64 subsequently reduces to a value corresponding to turbine-discharge steady-state pressure under afterburning conditions, the gas trapped in the reference pressure chamber 63 moves the diaphragm 62 downwardly, as viewed in Fig. 3, to move the contact element 52a away from the contact portion 66a, while the latter is permitted to assume its normal position, spaced from the contact element 54a. The pressure of gas in the reference pressure chamber 63 then gradually becomes equalized with that in the chamber 64 due to flow of gas throuhg the orifice 73, it being understood that the difference between the trapped reference pressure and the steady-state turbine-discharge static pressure during afterburning is insufficient to start a closing cycle.

If a blow-out or extinction of the flame in the afterburner 11 should occur, the sudden reduction in pressure of gas at the turbine discharge end of the afterburner is communicated to the chamber 64 immediately, while the orifice 73 retards a reduction in pressure in the reference pressure chamber 63, so that the diaphragm 62 is moved downwardly, as viewed in the drawing, to close the circuit through the coil 68 for closing the valve 71, and also to energize the nozzle opening circuit 31, thus effecting the desired increase in flow area of the engine nozzle.

While the invention has been shown in several forms, it will be obvious to those skilled in the art that it is not so limited, but is susceptible of various other changes and modifications without departing from the spirit thereof.

What is claimed is:

1. In power plant control equipment, a gas turbine having a discharge passage, an afterburner for receiving gases from said turbine discharge passage, variable area nozzle means for discharge of gases from the afterburner, electro-responsive nozzle controlling apparatus for closing and opening said nozzle means including a nozzle closing circuit and a nozzle opening circuit, switch means selectively operable to effect energization of either of said circuits, a casing having a reference pressure chamber and an operating pressure chamber, a movable abutment interposed between said chambers and operatively connected to said switch means for movement by a preponderance of reference pressure to effect energization of said nozzle closing circuit and for movement by a preponderance of operating pressure to effect energization of said nozzle opening circuit, a communication adapted to connect said reference pressure chamber to said turbine discharge passage, a normally open shut-off valve interposed in said communication, means for closing said shut-off valve to bottle up gas in said reference pressure chamber, and an always open communication connecting said operating pressure chamber to said turbine discharge passage.

2. Apparatus as set forth in claim 1 in which a restricted orifice is provided in the communication connecting the reference pressure chamber to the turbine discharge passage.

3. In power plant control equipment, a gas turbine having a discharge passage, an afterburner for receiving gases from said turbine discharge passage, variable area nozzle means for discharge of gases from the afterburner, electro-responsive nozzle controlling apparatus for closing and opening said nozzle means including a nozzle closing circuit and a nozzle opening circuit, switch means selectively operable to effect energization of either of said circuits, a casing having a reference pressure chamber and an operating pressure chamber, a movable abutment interposed between said chambers and operatively connected to said switch means for movement by a preponderance of reference pressure to effect energization of said nozzle closing circuit and for movement by a preponderance of operating pressure to effect energization of said nozzle opening circuit, a communication adapted to connect said reference pressure chamber to said turbine discharge passage, a normally open shut-off valve interposed in said communication, said valve having an always open restricted orifice, means responsive to starting of operation of said afterburner for closing said shut-off valve, and an always open communication connecting said operating pressure chamber to said turbine discharge passage.

4. Apparatus as set forth in claim 3 including a fuel conduit for supplying fuel under pressure to the afterburner, and fluid pressure means for actuating the means for closing the shut-off valve in response to the pressure of fuel in said fuel conduit.

5. Apparatus as set forth in claim 1 including an additional circuit controlled by the switch means, an electro-responsive means energized by said additional circuit for actuating the means for closing the shut-off valve.

References Cited in the file of this patent

UNITED STATES PATENTS

| | | |
|---|---|---|
| 2,411,895 | Poole | Dec. 3, 1946 |
| 2,566,961 | Poole | Sept. 4, 1951 |